US005796036A

United States Patent [19]

Courtaigne

[11] Patent Number: 5,796,036

[45] Date of Patent: Aug. 18, 1998

[54] REGUIDED CONNECTOR BOX

[75] Inventor: Bertrand Courtaigne, Paris, France

[73] Assignee: Blue Moon WW, France

[21] Appl. No.: 616,850

[22] Filed: Mar. 15, 1996

[30] Foreign Application Priority Data

Mar. 22, 1995 [FR] France .................................... 95 03320

[51] Int. Cl.$^{6}$ ........................................................ H02G 3/08

[52] U.S. Cl. ............................ 174/50; 285/320; 285/914; 403/333; 403/359

[58] Field of Search ......................... 174/50, 57; 285/320, 285/178, 914; 220/3.7, 3.8, 3.92, 3.94, 4.02; 403/359, 315, 316, 333, 334

[56] References Cited

U.S. PATENT DOCUMENTS

| | | | |
|---|---|---|---|
| 856,165 | 6/1907 | Krantz | 174/57 |
| 999,169 | 7/1911 | Jones | 285/320 X |
| 1,178,348 | 4/1916 | Robertson | 285/320 X |
| 2,647,533 | 8/1953 | Beymer | 285/320 X |
| 2,924,639 | 2/1960 | Zelt | 174/50 X |
| 3,386,606 | 6/1968 | Pastrick | 174/50 X |
| 3,573,344 | 4/1971 | Snyder | 174/57 |
| 4,023,697 | 5/1977 | Marrero | 220/3.92 X |
| 5,196,651 | 3/1993 | Pageaud et al. | 174/50 X |
| 5,383,098 | 1/1995 | Ma et al. | 220/4.02 X |

FOREIGN PATENT DOCUMENTS

| | | | |
|---|---|---|---|
| 0415136 | 3/1991 | European Pat. Off. . | |
| 2064647 | 7/1971 | France . | |
| 1465896 | 7/1969 | Germany . | |
| 2749122 | 5/1979 | Germany . | |
| 3403053 | 8/1985 | Germany | 174/58 X |

*Primary Examiner*—Kristine L. Kincaid
*Assistant Examiner*—Dean A. Reichard
*Attorney, Agent, or Firm*—William A. Drucker

[57] ABSTRACT

A connector box includes a female box element into which can be fitted a male box element, as well as a retaining device cooperating with a stop acting in a given zone of the periphery of the box elements, in order to maintain the male box element fitted into the female box element in a coupled position, one of the two facing surfaces of the two box elements having an increasing cross-sectional area having a generating line coming to bear against a generating line of the facing surface of the other box element and situated in an axial plane passing through the given zone, the greater cross-sectional area having a complementary shape with the facing cross-sectional area of the other box element when the two elements are completely coupled.

7 Claims, 1 Drawing Sheet

REGUIDED CONNECTOR BOX

BACKGROUND OF THE INVENTION

1. Field of the Invention

This invention relates to a connector box fitted with a new guidance device.

2. Description of the Prior Art

Electric connector boxes are often comprised of a fixed connector box and a plug box of substantially cylindrical or rectangular shape. The procedure for coupling these connector boxes usually consists in inserting one box element into the other. The two box elements must therefore be of substantially equivalent shape but of different volume so that the outer box has an interior volume slightly greater than the exterior volume of the inner box element. Sufficient play must be provided between the two box elements for maneuvering purposes.

However, it is advantageous that this play be mastered as well as possible to achieve a well defined relative position at the end of the coupling procedure.

Ordinary connector boxes are often devoid of any particular axial guiding means, with the result that the coupled box elements do not coincide perfectly with one another and reveal both sizeable and irregularly shaped apertures into which dust or liquids can penetrate. The drawbacks caused by this misalignment or nesting flaw at the end of travel is particularly important in the case of connector boxes with no tightening means such as a nut, bayonet or other mechanical means, and for which the retention of one box element in the other is guaranteed by a device such as a lid with a stop or hook on one of the box elements and a toe or change of diameter on the other box element.

In the final coupling phase, this type of box has a flaw in the alignment of the two box elements enabling the formation, between the longitudinal axes of the two box elements, of an angle inducing an irregular annular space between the two box elements. In the case of boxes equipped with an ejection spring for the purpose of sudden separation, the reaction of the compressed spring exaggerates the nesting flaw and causes a relative position of the two box elements such that the planes perpendicular to the longitudinal axes of the two box elements are not parallel.

This flaw in the parallelism can cause various difficulties. It is understandably difficult to make tight boxes thus coupled lop-sidedly. It is also understandable that, in such a box, push contacts will perform differently as a function of their position in the insulating, and small contacts will risk uncertain contact if they are situated at the end opposite the box retaining device.

There is therefore an obvious advantage in having a gradual reguiding device which provides sufficient play for the nesting of the two connector box elements while correcting, at the end of the stroke, the alignment and parallelism flaw previously described. A known means for reducing these flaws consists in adding humps in various places on the box elements so that, at the end of the stroke, the former straighten the inner element in the outer element. This way of proceeding has the notable advantage of leaving the procedure, consisting in nesting the two box elements into one another, unhindered over the greater plug-in length, only restricting the relative free play of one in the other over a short length.

This solution has nonetheless major flaws. The humps, even if they are smoothed by small bevels, can hinder the insertion of one box element into the other and can cause a stop impact that can lead to either damage to one part or accelerated wear thereof.

Furthermore, this hump solution is difficult to implement insofar as its efficiency is directly related to their position in relation to the retaining device. If the humps are on the inner box element, they must be immediately below the retaining device. If they are on the outer box element, they must be at the end opposite the retaining device. This rigidity in their relative positioning makes them difficult or even impossible to use in connector boxes using toes and variable position keying grooves according to the voltages or currents for which they are used, and the grooves can be situated at the very place a hump would be efficient.

Finally, the end-of-travel hump system accumulates its own additional end-of-travel friction stress at the very moment of the coupling procedure when the operator must already overcome the other stresses required to crush a seal, pass over the hard point of the retaining device or compress an ejection spring.

OBJECT OF THE INVENTION

The main object of this invention is to remedy the preceding disadvantages, particularly to improve and facilitate the coupling of connector box elements by eliminating the parallelism and alignment flaw previously described.

SUMMARY OF THE INVENTION

The connector box embodying the invention comprises a male box element intended to come and fit into a female box element, and a disconnectable locking means acting in a given zone of the periphery of the box elements situated outside the facing surfaces of the elements, in order to maintain the male box element fitted into the female box element in a coupled position.

In the connector box according to the invention, one of the two facing surfaces of the two box elements has an increasing cross-sectional area having a generating line coming to bear against a generating line of the facing surface of the other box element, these generating lines being situated in an axial plane passing through said zone, the greater cross-sectional area having substantially a complementary shape with the facing cross-sectional area of the other box element when the two elements are completely coupled.

The nesting of these two box elements embodying the invention is performed in such a way that, at the start of the coupling maneuver, the play between the two elements is substantial and becomes gradually and regularly reduced, without any jolts, up to the final position when the locking means fulfils its function.

The locking means can comprise, mounted on one of the box elements, a retaining device such as a hinged lid equipped with a stop or hook, whereas the other box element comprises a toe or change of diameter or any other device intended to catch onto the lid stop or hook of the other element.

According to a first embodiment of the invention, the male box element has an outer surface facing the female box element having a cross-sectional area increasing in the direction of the rear side of said male element, the generating line of the outer surface of the male element coming into contact with a generating line of the inner surface of the female box element being situated at the opposite end of said zone in relation to the axes of the two box elements.

According to a second embodiment of the invention, the female box element has an inner surface facing the male box element, of which the cross-sectional area increases towards the bottom of said female element, the generating line of the inner surface of the female element coming into contact with a generating line of the outer surface of the male box element being situated in the region of said zone.

The surface facing the box element with an increasing cross-sectional area is of asymmetrical truncated conical shape.

Alternatively, the facing surface of the box element having an increasing cross-sectional area is inscribed within a frustum of a prism, or frustum of an asymmetric pyramid.

In either embodiment of the invention, the keying grooves of variable thickness and position can be hollowed out in the thickness of the truncated, wall without affecting the efficiency thereof.

BRIEF DESCRIPTION OF THE DRAWINGS

Further features and advantages of the invention will be apparent from the embodiments of the invention described, by way of non-limiting examples, in reference to the corresponding accompanying drawings in which.

DESCRIPTION OF THE PREFERRED EMBODIMENTS

Figure 1:
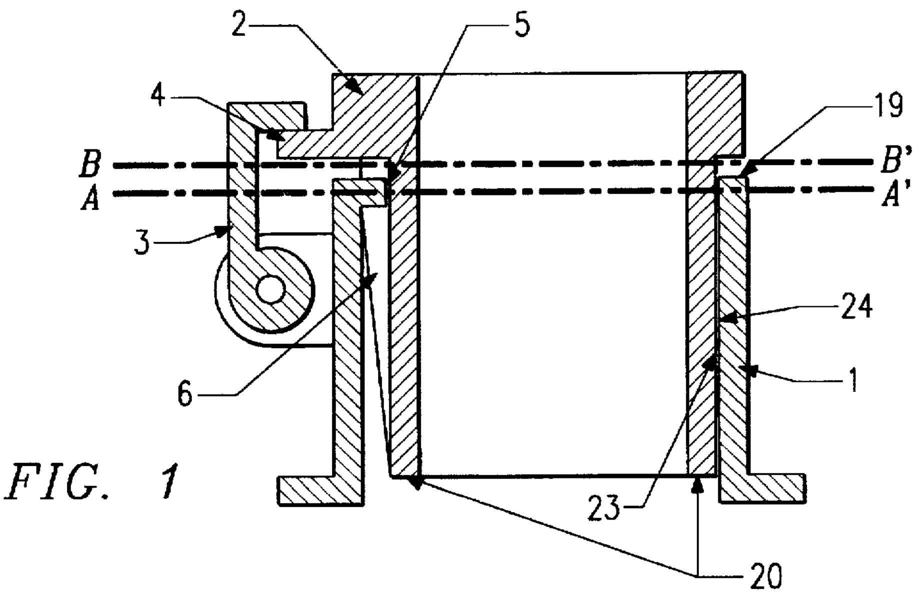
FIG. 1 represents a sectional drawing of the two connector box elements according to the invention in the coupled position.
Figure 2:
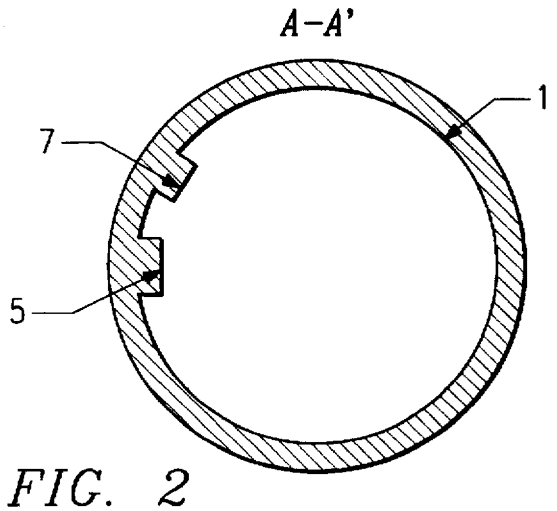
FIG. 2 represents the sectional drawing of the outer box along AA' in FIG. 1.
Figure 3:
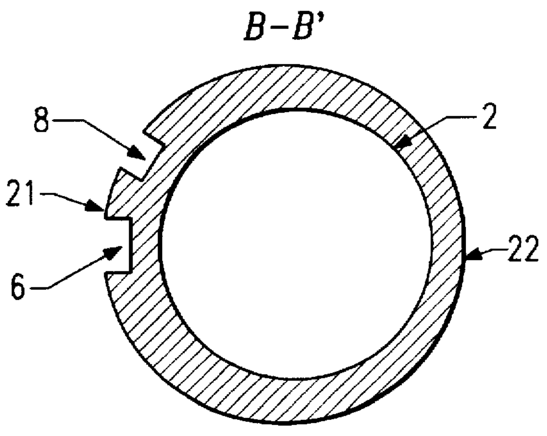
FIG. 3 represents the sectional drawing of the inner box along BB' in FIG. 1.

In reference to FIGS. 1, 2 and 3, the connector box comprises a female box element 1 coupled with a male box element 2. To this end, the box elements 1,2 are of substantially equivalent tubular shape but have different volumes in such a way that the female box has an interior volume slightly larger than the exterior volume of the male element.

These elements are maintained in the coupled position by a retaining device 3, such as a hook, engaged behind a toe 4.

The male box element 2 has a cylindrical interior and a truncated concical exterior volume, in such a way that the front part 20 of the element 2 has a cross-section of constant thickness whereas its rear part is thicker on the hook 21 side than on the opposite side 22.

In FIG. 1, the female box element 1 is of cylindrical shape of constant thickness.

In the coupled position, the generating line 23 of the outer surface of the male box element 1, situated opposite the retaining device 3, comes to bear against the corresponding generating line 24 of the inner surface of the female box element 1.

Inwardly pointing keying toes 5,7 are disposed on the front part 19 of the female connector box element 1, whereas the male box element 2 comprises radial keying grooves 6,8, made on its outer side, in which the keying toes 5,7 are guided during the coupling of the male box element 2 and the female box element 1.

Advantageously, the radial keying grooves 6,8 are made in the thickest part of the wall of the male element 2 in order for the thickness of the wall at the bottom of the grooves 6,8 to be constant and substantially equal to the thickness of the front part 20.

In FIGS. 2 and 3, the dimensions of the keying elements 5,6 and 7,8 are different in order to perform a foolproof function.

Figure 4:
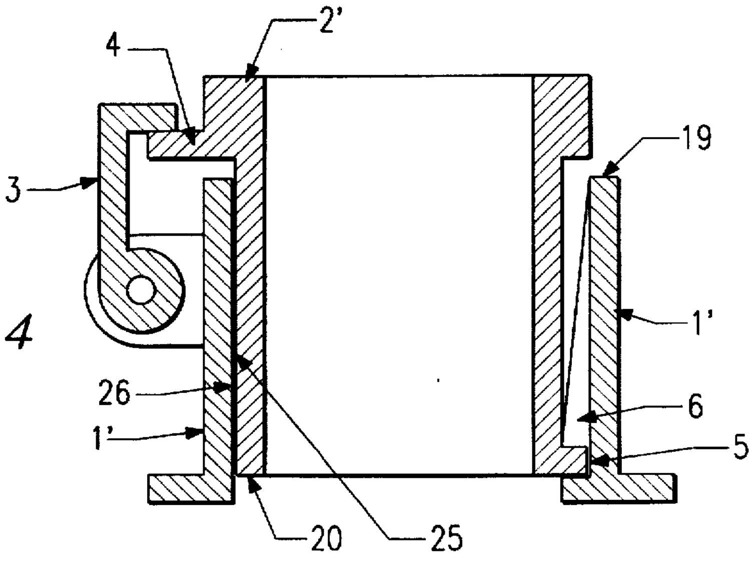
FIG. 4 represents a sectional drawing of another embodiment of the connector box according to the invention.

According to another embodiment of the invention represented in FIG. 4, the male box element 2' has a constant thickness, whereas the female box element 1' has an inner surface of asymmetrical truncated conical shape of which the larger base is situated at its opening. The generating line 26 of this surface, which comes to bear against a generating line 25 of the male element 2', is then situated on the retaining device 3 side.

In this embodiment, the keying toes 5,7 are disposed at the level of the front part 20 of the inner element 2' and are pointed outwards, whereas the keying grooves 6,8 are hollowed out in the inner side of the female box element 1' and in the thickest part thereof.

The box elements can, of course, have a cross-section of any other shape, e.g. triangular, rectangular, polygonal or elliptical.

I claim:

1. A connector box comprising a first box element and a second box element which can be fitted into one another in a coupled position in which said first and second box elements each have a respective surface, with the respective surface of each box element facing the respective surface of the other box element, and disconnectable locking means acting in a single zone of a periphery of said first and second box elements situated outside said respective surfaces of said box elements, to maintain said first and second box elements in said coupled position, the respective surface of said first box element having constant cross-sectional areas in a direction along a longitudinal axis of said first box element, whereas the respective surface of said second box element has in a direction along a longitudinal axis of said second box element increasing cross-sectional areas comprising a greater cross-sectional area, the respective surface of said first box element having a single generating line coming to bear against a generating line of the respective surface of said second box element in said coupled position, said generating lines being situated in an axial plane passing through said zone, said greater cross-sectional area having substantially a complementary shape with a facing cross-sectional area of said first box element in said coupled position.

2. The connector box as claimed in claim 1, wherein the respective surface of the second box element is an outer surface of the second box element, and the respective surface of the first box element is an inner surface of the first box element, said outer surface having cross-sectional areas increasing towards a rear side of said second element, said generating lines of said first and second box elements being situated at an opposite side of said longitudinal axis from said zone.

3. The connector box as claimed in claim 1, wherein the respective surface of the second box element is an inner surface of the second box element, and the respective surface of the first box element is an outer surface of the first box element, said inner surface having cross-sectional areas increasing toward a bottom of said second element, a point at which said generating lines of said first and second box elements come into contact with one another being situated in said zone.

4. The connector box as claimed in claim 1, wherein the respective surface of said second box element is of asymmetrical truncated conical shape.

5. The connector box as claimed in claim 1, wherein the respective surface of said second box element is inscribed within a frustum of a pyramid or of a prism.

6. The connector box as claimed in claim 1, wherein keying grooves are hollowed out in the respective surface of said second box element and coincide with keying toes provided on said first box element, said keying toes being guided in the keying grooves during coupling of said box elements with one another.

7. The connector box as claimed in claim 1, wherein the locking means comprises a retaining device equipping one of said two box elements, whereas the other box element comprises a stop intended to coincide with said retaining device when said two box elements are in said coupled position.

* * * * *